Patented Aug. 14, 1928.

1,680,915

UNITED STATES PATENT OFFICE.

REED P. ROSE, OF JACKSON HEIGHTS, NEW YORK, ASSIGNOR TO THE MECHANICAL RUBBER COMPANY, OF CLEVELAND, OHIO, A CORPORATION OF NEW JERSEY.

METHOD OF TREATING RUBBER-FIBER WASTE MATERIAL.

No Drawing.  Application filed January 7, 1928. Serial No. 245,276.

This invention relates to a method of treating rubber-fiber waste material, more particularly to a method of reclaiming such a material by which either the rubber or the fiber or both may be recovered in good condition.

Various methods have been used for reclaiming rubber-fiber materials. In some of these high heat, high pressure, strong reagents or combinations of these have been used, but such methods are relatively expensive and the fiber is often either completely destroyed or so badly damaged that it is of practically no commercial value after the treatment. Methods which are mainly mechanical have also been used where the waste material is ground up and then treated in an ordinary beater for preparing paper stock, the action of the beater roll being to both brush out the fiber and also remove some of the rubber adhering to it. However, it is practically impossible to completely remove the rubber from the fiber, even after extreme beating, and as a result small particles of rubber remain on the fiber so that they cause lumps if the fiber is made into paper or render it difficult to spin the fiber if the latter is to be made into yarn.

An object of the present invention is to provide an improved process for reclaiming either or both rubber and fiber from a waste rubber-fiber material. Another object is to recover fiber from the material without injury to the fiber rendering it unsuitable for the desired purpose. Still another object is to provide a method by which scrap rubber and fiber material can be converted into a uniform rubber and fiber composition.

The invention consists broadly in treating a waste rubber-fiber material by mechanical working in the presence of an agent which assists in reducing the material to a plastic putty-like consistency, neutralizing any acids present or formed in the operation, and beating the product in an alkaline aqueous medium until the rubber is entirely removed from the fiber and dispersed in the medium. It also includes the separation of the dispersed rubber from the fiber if desired, and it may also include continuing the beating operation until the fiber has been brought to a paper making condition.

In carrying out the invention a quantity of a waste rubber-fiber material, for instance tire casings, is first shredded in any suitable manner, the shreds of the material preferably being kept as long as possible, for instance from ½–1 inch in length. After the shredding operation the material should be analyzed to determine its actual rubber content. The shredded material is then placed in any suitable type of mixer such as a Werner-Pfleiderer, and for each 100 parts of rubber in the batch there is added about 10 parts of oleic or stearic acid. Instead of these any other organic soluble-soap-forming acid may be used, such as resin acids, or compounds containing suitable acids such as pine tar, white pine pitch, sulphonated oils, and various commercial oils of an acidic character. The mixture is then agitated until all of the oleic acid or equivalent material has been thoroughly mixed with the shredded rubber-fiber material. After proper working the rubber constituent of the mixture will have assumed a plastic putty-like consistency and the mass will be free from any particles of ground rubber or the added acid. With a mixer of the Werner-Pfleiderer type the operation will usually consume about 3–4 hrs. If desired the process may be hastened by heating the contents of the mixer to 100° C. but this is not essential. Various types of rubber-fiber scrap may be used, and it is immaterial whether the rubber in the scrap is in the raw, vulcanized or reclaimed condition.

After the batch has attained a plastic consistency, for each 100 parts of rubber there are added from 12–15 parts of caustic soda or equivalent alkali in the form of a 5–40% aqueous solution, and the mixing operation is then continued for from 10–30 minutes. The batch is then removed from the mixer and is placed in an ordinary beating engine with enough water so that the fiber content of the mass is equivalent to 4–10% of the weight of water in the beater. Prior to placing the batch in the beater sufficient caustic soda or equivalent alkali is added to the water in the beater to give a solution of about ½–1% alkali. It is also desirable, although not essential, to add enough sodium silicate to give a solution of from 1–2% in the beater, and other protective colloids such as glue, casein, alginic acid, tannin, soaps, and equivalent materials may be added. During the addition of these materials to the water in the beater the beater roll is raised off the bedplate. Then without lowering the roll on the bed plate the plastic mass removed from the Werner-Pfleiderer machine is gradually added to the solution in the beater. After the mass has been thoroughly distributed in the water in the beater the roll is gradually lowered on to the bed plate, care being taken never to have it completely down. During the beating operation the fibers are brushed out and the rubber content of the fiber is removed therefrom and dispersed in the aqueous medium. The protective colloid or colloids are added to stabilize the dispersion of rubber as it is formed and prevent it from coagulating and again adhering to the fibers. The time required for the treatment in the beater will vary according to the time necessary to completely form a dispersion of the rubber, and also in accordance with the use to which the fiber is to be put after it is freed from the rubber. If it is desired to keep the cotton fibers relatively long as for spinning, the beating operation is stopped after the rubber has been completely dispersed; but if the fiber is to be made into paper and analogous material the beating is then carried further to the extent necessary for forming the particular material in mind. If the rubber and fiber are to be separately used the rubber dispersion, after being completely formed, may be removed from the fiber by any suitable filtration method as by means of a small mesh screen, and any rubber dispersion remaining on the fiber may then be washed therefrom by means of water containing a small amount of alkali and perhaps a protective colloid. The rubber dispersion may be used in various ways, or if it is desired to directly recover the rubber from the dispersion the latter may be coagulated by means of acids or acid salts such as acetic acid or alum and the coagulated rubber then removed by filtration.

If it is desired to form a composite rubber-fiber sheet or article from the product, the rubber dispersion may be recoagulated on the fiber in any of the usual ways, and with or without the addition of natural latex or other rubber dispersion or other compounding materials.

By the use of my process either the rubber or the fiber may be entirely removed from a rubber-fiber material, and the fiber may be recovered in good condition for spinning or for paper making purposes. It will be seen that the process is economical, and does not require the use of either high temperature, high pressure or strong reagents.

It will be obvious that with the above disclosure variations will suggest themselves to those skilled in the art and it is not desired to limit the invention otherwise than as set forth in the appended claims.

Having thus described my invention what I claim and desire to protect by Letters Patent is:

1. The method of treating rubber-fiber waste material which comprises mechanically working the broken up material in the presence of a soluble-soap-forming organic acid until the rubber component has assumed a plastic putty-like consistency, adding an alkali in solution and continuing the working, and finally beating the product in the presence of alkaline water until the rubber is completely removed from the fiber and in dispersed form.

2. The method of treating rubber-fiber waste material which comprises mechanically working the broken up material in the presence of a soluble-soap-forming organic acid until the rubber component has assumed a plastic putty-like consistency, adding an alkali in solution and continuing the working, finally beating the product in the presence of alkaline water until the rubber is completely removed from the fiber and in dispersed form, and separating the fiber from the dispersion.

3. The method of treating rubber-fiber waste material which comprises mechanically working the broken up material in the presence of a soluble-soap-forming organic acid until the rubber component has assumed a plastic putty-like consistency, adding an alkali in solution and continuing the working, and finally beating the product in the presence of alkaline water and a protective colloid until the rubber is completely removed from the fiber and in dispersed form.

4. The method of treating rubber-fiber waste material which comprises mechanically working the broken up material in the presence of a soluble-soap-forming organic acid until the rubber component has assumed a plastic putty-like consistency, adding an alkali in solution and continuing the working, finally beating the product in the presence of alkaline water and a protective colloid until the rubber is completely removed from the fiber and in dispersed form, and separating the fiber from the dispersion.

5. The method of treating rubber-fiber waste material which comprises mechanically working and heating the broken up material in the presence of a soluble-soap-forming organic acid until the rubber component has assumed a plastic putty-like consistency, adding an alkali in solution and continuing the working, gradually mixing the plastic product with an alkaline water, and beating until the rubber is completely removed from the fiber and in dispersed form and the fiber is reduced to the desired paper making condition.

6. The method of treating rubber-fiber waste material which comprises mechanically working the broken up material in the presence of about 10 parts of a soap forming fatty acid until the rubber component has assumed a plastic putty-like consistency, adding 12–15 parts of caustic soda in aqueous solution for each 100 parts of rubber and continuing the working, and finally beating the product in an aqueous medium containing an alkali and a protective colloid until the rubber is completely removed from the fiber and in dispersed form.

Signed at New York, New York, this 5th day of January, 1928.

REED P. ROSE.